Nov. 7, 1933.  F. A. THOMANN  1,933,881
COTTON HARVESTER
Filed April 9, 1932   6 Sheets-Sheet 1
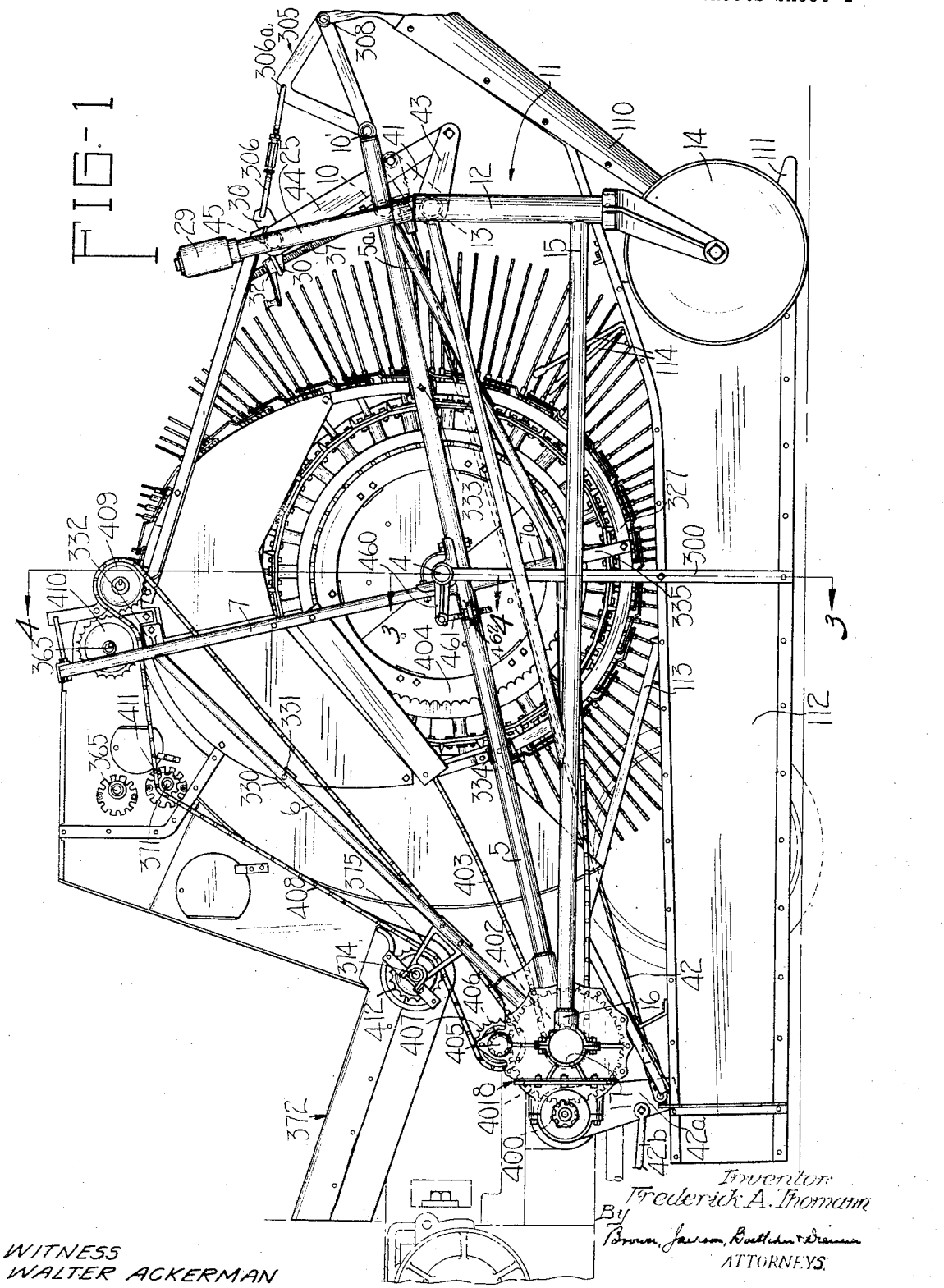
WITNESS
WALTER ACKERMAN
Inventor
Frederick A. Thomann
By
ATTORNEYS

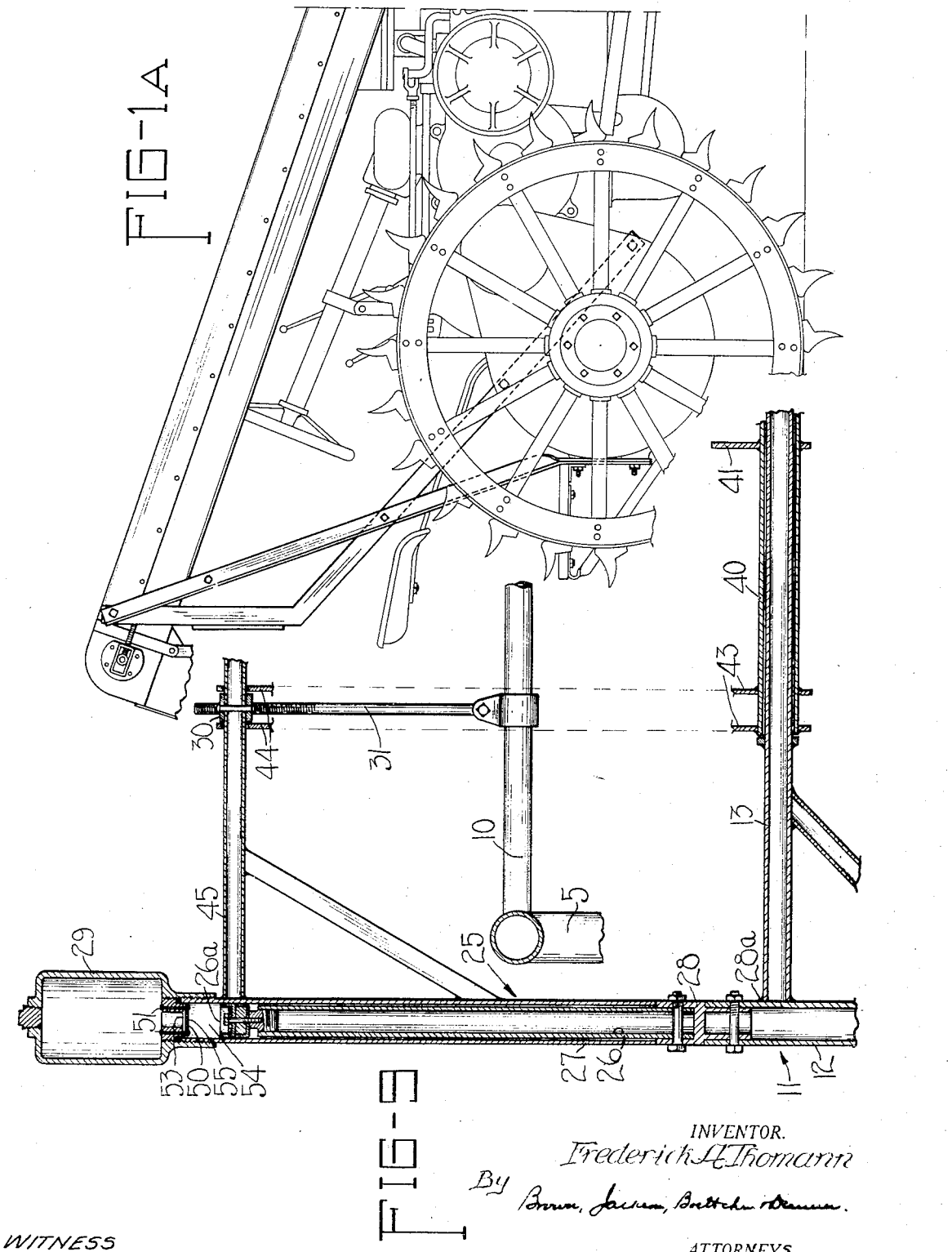

Nov. 7, 1933.  F. A. THOMANN  1,933,881
COTTON HARVESTER
Filed April 9, 1932  6 Sheets-Sheet 3
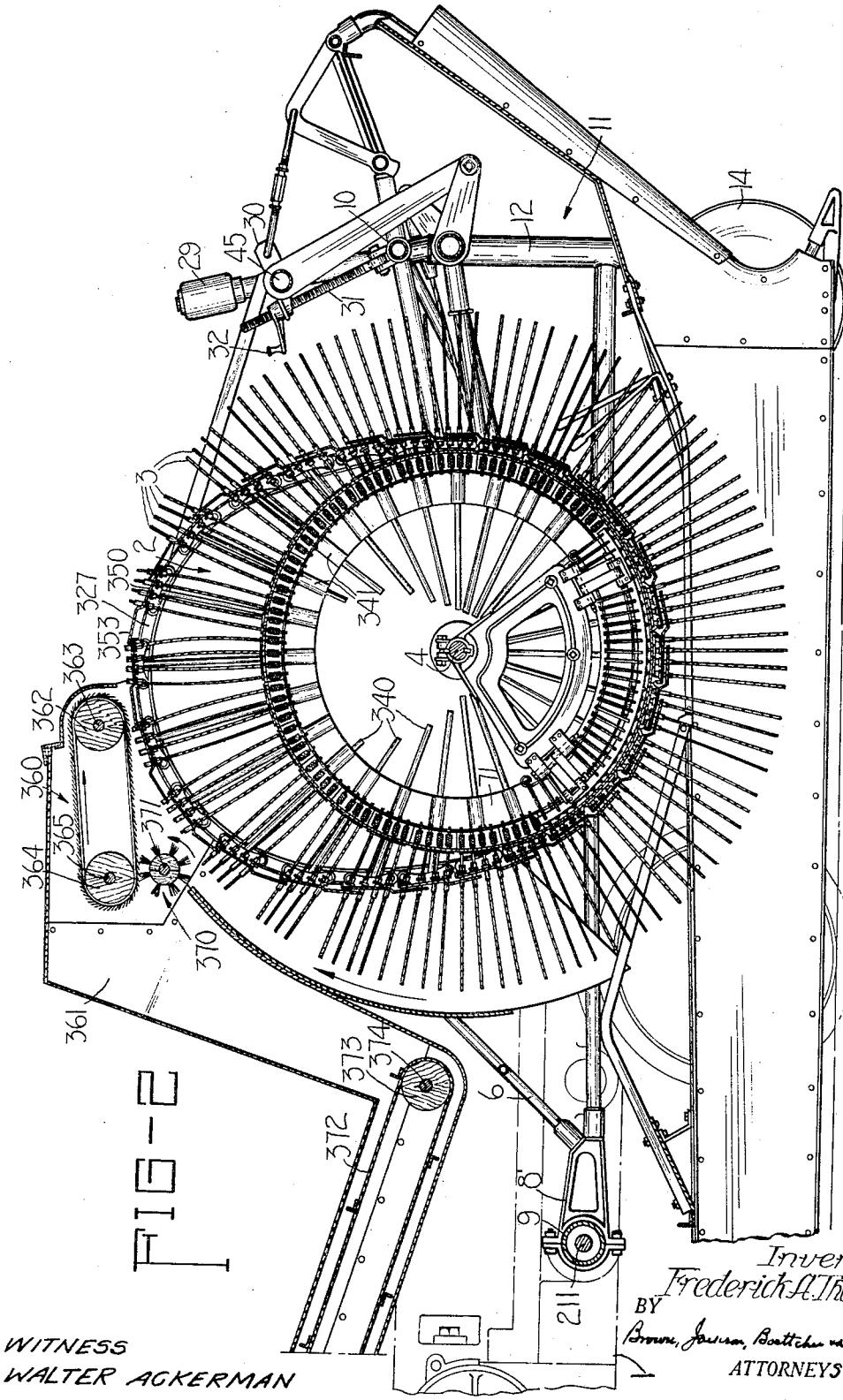
WITNESS
WALTER ACKERMAN
Inventor
Frederick A. Thomann
BY
Brown, Jackson, Boettcher and Dienner
ATTORNEYS

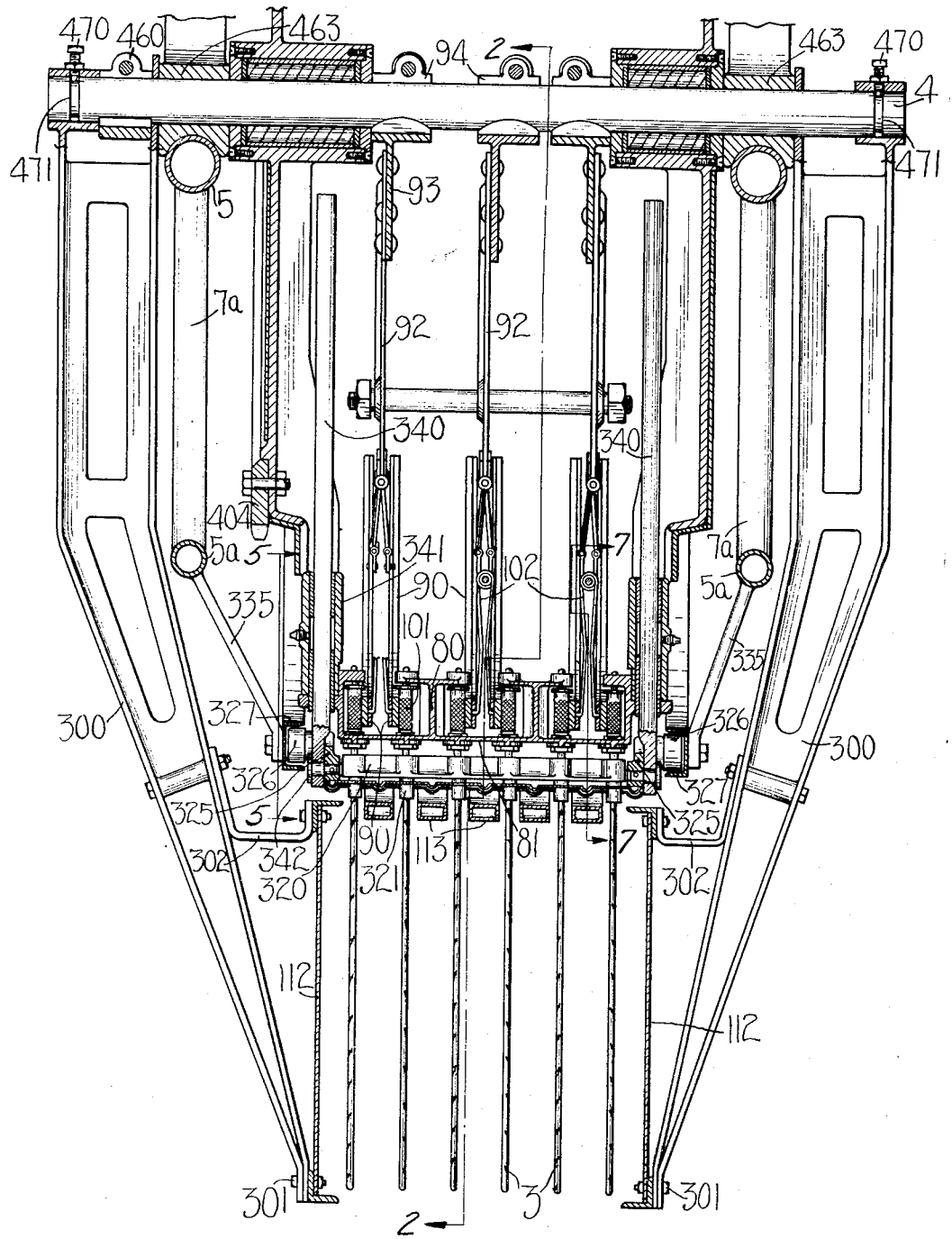

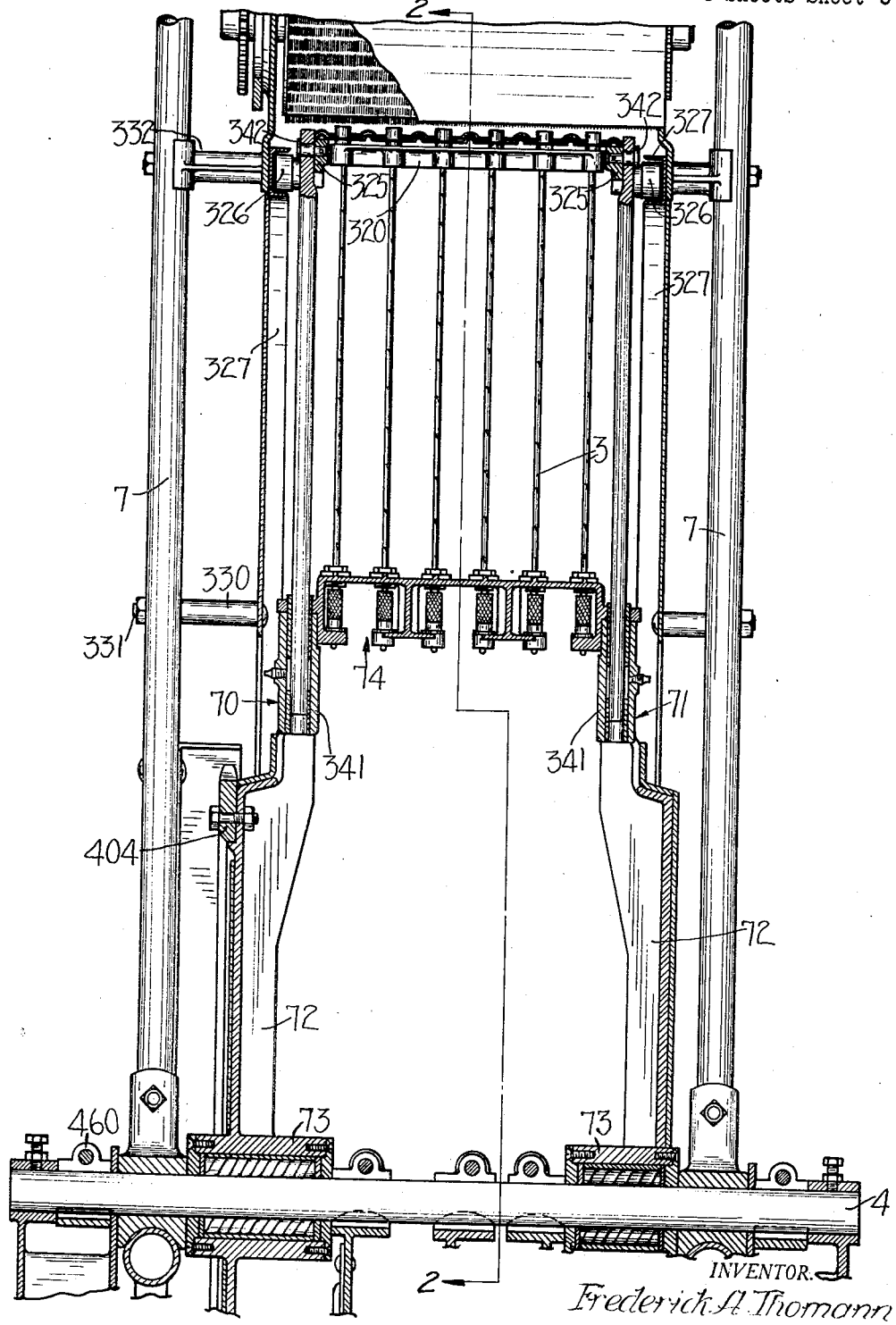

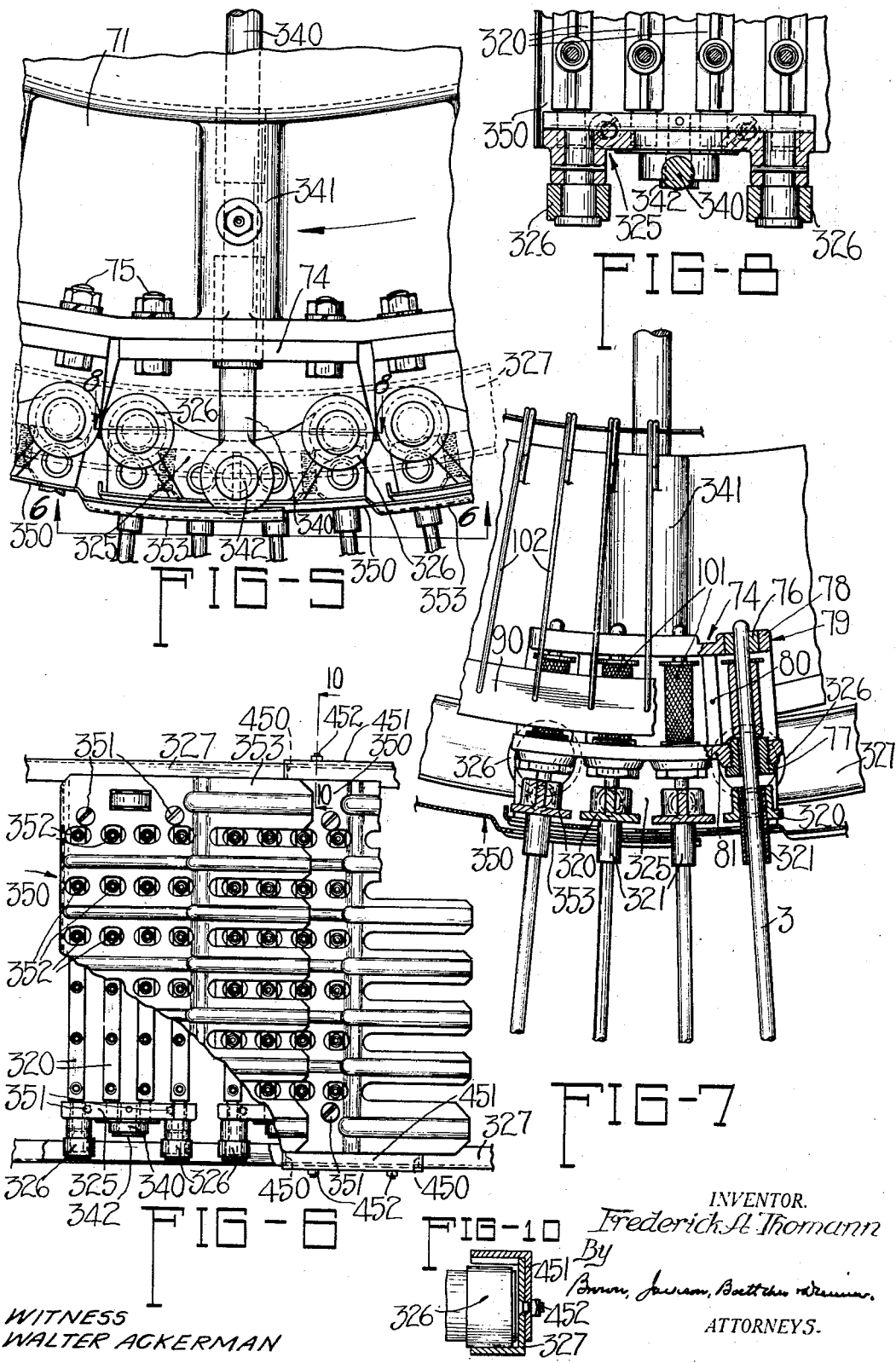

Patented Nov. 7, 1933

1,933,881

UNITED STATES PATENT OFFICE 1,933,881

COTTON HARVESTER

Frederick A. Thomann, East Moline, Ill., assignor to Deere & Company, Moline, Ill., a corporation of Illinois Application April 9, 1932. Serial No. 604,196

32 Claims. (Cl. 56—14)

The present invention relates generally to cotton harvesters and is particularly concerned with cotton harvesters of the picking or needle type in which a plurality of rotating needles are projected into the cotton plant to gather the cotton and in which suitable means are provided for removing the cotton from the needles. More specifically, the present invention contemplates a cotton harvester in which the picking mechanism comprises a drum rotatable about a horizontal axis and provided with individually rotatable needles mounted in radial position with respect to the drum, the drum being supported upon a wheeled frame so that as the machine is advanced forwardly along the plant row the needles are projected into the cotton plants to remove the cotton therefrom.

In this type of agricultural machine, the present invention has for its principal object the provision of a new and improved mechanism for removing the cotton from the rotatable needles. Briefly the present invention employs a plurality of stripper bars movable axially of the needles and connected together, in connection with means such as tracks or the like for guiding the stripping bars and controlling the movement thereof during the rotation of the needle carrying drum. More particularly, the present invention contemplates grouping the stripping bars into groups of two or more bars suitably mounted on carriages which are guided by track means at either side of the drum.

Another object of the present invention is the provision of guide means associated with the stripping bar carriages, said guide means serving to insure the proper movement of the stripping bars and being constructed and arranged so that they never come into contact with the plants, whereby the operations of picking of the cotton and the removal of the same from the needles are not interfered with.

Another object of the present invention is the provision of means, preferably associated with the stripper bars, serving to prevent the cotton from falling into the drum and getting behind the stripper bars where it would interfere with the proper operation of the machine. Briefly, the preferred construction embodies a plurality of overlapping plates which effectively prevent any cotton from falling into the needle drum inwardly of these plates.

The present invention also contemplates a new and improved means for removing the cotton from the needle drum as the stripper bars are moved outwardly of the needles to strip the cotton therefrom. The present invention particularly contemplates a construction especially adapted for machines where the needle drum rotates about a horizontal axis and which cooperates with the needles and stripper bars so that all cotton is removed. Briefly, such mechanism comprises a carding belt mounted for movement about the needle drum, by reason of which construction any cotton that is stripped from the needles before it reaches the carding belt is nevertheless readily conveyed thereto by the rotation of the needle drum about its horizontal axis.

The present invention is also concerned with the provision of a novel form of tunnel construction. By the term tunnel is meant the longitudinally arranged walls through which the cotton plants move during the progress of the machine along a plant row, such tunnel means serving to guide the cotton plants toward the needles rotatably mounted on the picking drum. The present invention also includes novel means for supporting the tunnel means so that the position thereof is not materially affected by adjustments of the picker units for height.

Still further, another object of the present invention is to improve the needle drum construction by arranging the radially disposed picking needles in groups or sections, each section or group of picking needles being removable from the drum as a unit. Thus, not only may any one or more sections be readily removed without disturbing the needles of the other sections, but also the picker units may more readily be assembled during the manufacture thereof. In addition, the bearing means for the rotatable needles have also been improved with the object in view of providing for easy removal of the needles from the associated section or sections. Also, the present invention preferably so arranges the stripper bars that they may be readily removed from the machine in order to accommodate the ready removal of the stripping needle sections.

Other objects and advantages of the present invention will be apparent to those skilled in the art after a consideration of the following detailed description of the preferred structural embodiment, taken in conjunction with the accompanying drawings in which:

Figure 1 is a side elevation of a machine embodying the principles of the present invention, illustrating in particular a machine which is of the two-row tractor pushed type, that is, a machine capable of picking two rows of cotton and which includes one or more picking units carried upon or propelled by a tractor;

Figure 1a is a continuation of the view shown in Figure 1 and illustrating the rear end of the tractor with the flight elevator conveying the picked cotton rearwardly supported on the tractor;

Figure 2 is a vertical longitudinal section taken along the line 2—2 of Figures 3 and 4 and illustrating in particular the raising and lowering means for the picker units, the relation between the rotating needles and the stripping bars, and the means including a carding belt for removing the cotton from the picking drum after the cotton has been stripped from the picker needles;

Figure 3 is a transverse sectional view taken along the line 3—3 of Figure 1;

Figure 4 is a transverse sectional view taken along the line 4—4 of Figure 1;

Figure 5 is an enlarged fragmentary view taken along the line 5—5 of Figure 3 illustrating the arrangement of the needle supporting sections and the stripping bars together with the guide rod means for the latter;

Figure 6 is a view taken along the line 6—6 of Figure 5 and showing certain parts broken away in order to better illustrate the stripper bars and the overlapping plates which prevent the picked cotton from falling into the drum;

Figure 7 is an enlarged fragmentary sectional view taken substantially along the line 7—7 of Figure 3 illustrating in particular the bearing supports for the rotatable needles and the means for driving the needles;

Figure 8 is a fragmentary section taken along the line 8—8 of Figure 5 and looking in the direction of the arrows;

Figure 9 is a cross sectional view illustrating the cushioning means for the picking units and the means for adjustably supporting the forward ends of the latter; and Figure 10 is a fragmentary section taken along the line 10—10 of Figure 6 and illustrating the removable sections of the stripper bar cam track.

Referring now to the drawings, it will be observed that the structure there shown is a two-row tractor pushed machine comprising cotton picking mechanisms positioned on opposite sides of a tractor, the latter being indicated by the reference numeral 1. Each mechanism comprises a drum 2 from which a plurality of picking needles 3 radiate. Drum 2 is journaled on a shaft 4 and is supported in two frame structures positioned on opposite sides of the drum. Each frame structure comprises members 5, 6 and 7. Members 5 and 6 of the two frame structures of each picking mechanism terminate in castings 8 and 8', the casting 8 being on the laterally outer side of each picking mechanism and the casting 8' being on the laterally inner side of each mechanism. These castings are journaled on a transverse pipe 9 fixed to the under side of the tractor. Pipe 9 thus forms the axis upon which the frame structures supporting the drum pivot for vertical movement. The two frame structures of each picking mechanism are connected together at their front end by means of a brace 10.

The front ends of the two picking mechanisms are carried on a wheel supported frame 11 comprising two vertical sleeves 12 connected together by means of a transverse pipe 13. A pair of caster wheels 14 are supported in these sleeves. Extending rearwardly from the spindles are members 15 which terminate at their rear ends in castings 16 which are pivotally mounted to spindles 17 extending outwardly from castings 8.

The front ends of the picking mechanisms are supported from pipe 13 through standards 25 shown in detail in Figure 9. These standards comprise two telescoping sections 26 and 27, the inner section 26 being fixed to a casting 28 secured to the upper end of the spindle 12 while the outer section 27 is capable of vertical movement with respect to the inner section. The outer section 27 is provided with a cap 29 on its upper end serving as a liquid reservoir, the telescopic section 27 acting as a cylinder with which a piston 26a carried at the upper end of the section 26 cooperates for a purpose which will hereinafter appear.

Pipe 40 is journaled on pipe 13 and is provided with an arm 41 which is connected by means of a cable 42, pendulum 42a and link 42b with the power lift mechanism of the tractor. Pipe 40 is provided with a pair of arms 43 at each end. A pair of links 44 pivotally connect these arms with a cross connecting member 45 which is rigidly connected to the upper end of the two sections 27 of standards 25. The two picking mechanisms are supported from member 45 through links 31 pivoted to brace 10 and adjustably connected to bracket 30 pinned on pipe 45.

By virtue of the cylinder and piston construction 26—26a, the descent of the drum frames is cushioned, a check valve 50 being provided in the cap or head 29. Valve 50 is slidably supported on pins 51 so that it may leave its seat over the opening 53 and move to the position shown in Figure 9. This is the position the valve assumes when the mechanism is being raised, at which time oil retained in the cavity of cap 29 passes down through the opening 53 and around the valve 50 into the cavity 54. When the mechanisms are lowered, the outer section 27 of each of the standards 25 is forced downwardly which causes valve 50 to seat itself upon its seat and the oil in the cavity 54 is forced through the small opening 55 in the center of the valve 50. The flow of oil into the upper cavity is thereby constrained so as to cause the mechanisms to be lowered gently.

The drum 2 comprises two wheel-like members having rims 70 and 71 integrally connected by means of spokes 72 with hubs 73 journaled on shaft 4. Rims 70 and 71 are connected by a plurality of needle supporting sections 74 by means of bolts 75, see Figure 5. There are twenty-one such sections 74. Each section supports twenty-four needles, four needles of each of six circumferential rows. The needles are journaled in section 74 in two bearings 76 and 77. Bearings 76 are pressed in perforated bosses 78 formed in arms 79 extending laterally from flange 80 extending inwardly from the needle supporting sections. Bearings 77 are screwed into threaded openings in the face 81. It will be noted that the threaded borings into which the bearings 77 are screwed are somewhat larger than the knurled bushings 101. This is for a purpose which will hereinafter appear.

The needles are also rotated during the time they are within the plant by similar arcuate shaped shoes 90 which are supported in pairs of arms 92 fixed to arms 93 extending outwardly from hubs 94 keyed to shaft 4. Shoes 90 are held in engagement with the knurled enlargements 101 by means of coiled springs 102.

Normally the shaft 4 is fixed but in order to provide for adjusting the needle driving shoes 90 the shaft 4 is arranged for limited rocking to permit adjusting the same. To accomplish this purpose the shaft 4 has an arm 460 fixed thereto, see Figures 1 and 3. A bolt 461 is pivoted to the end of arm 460 and passes through a perforation in a lug 462 provided on frame member 5. A nut is threaded on bolt 460, one being positioned on either side of lug 462. By adjusting these nuts, shaft 4 may be rocked to a limited extent in its bearings 463 and locked in any adjusted position. By this adjustment the position of shoes 90 can be adjusted and the time at which the rotation of the needles 3 is initiated can be regulated.

The tunnel into which the cotton plants are guided comprises side plates 112 and has a ceiling composed of longitudinally extending bars 113. The bars 113 are bent upwardly at their rear end and are provided with guides 114 near their front end to guide the needles between the bars. The tunnel is supported through a pair of arms 300 journaled on the ends of shaft 4 and connected with the sides 112 by bolts 301 and by brackets 302. Arms 300 are retained in shaft 4 by means of the dog point bolts 470, the points of which extend into the circumferential recess 471 in the shaft. At their front ends these tunnels are supported through mechanism comprising a bell crank member 305 which is journaled on the cross member 10' and is link connected by means of link 306 to the bracket 30 fixed to the cross brace 45. The tunnel is pivotally connected to bell crank at 308.

The purpose for suspending the tunnel through the above described mechanism is to cause the tunnel to be unaffected by the height adjustment at which the cylinder is operated, effected through the operation of nut 32. For example, when nut 32 is turned so as to raise the picking drums, point 10' moves upwardly and point 306a also moves upwardly but only a slight amount and not as much as does point 10 since link 306 pivots about the connecting bracket 30, as a result of which point 308 has a slight fore and aft movement but relatively no vertical movement.

The stripping mechanism comprises a series of stripping bars 320, one bar for each longitudinal row of six needles. These bars are provided with sleeves 321 through which the needles project, as best shown in Figure 7. The stripping bars are grouped in sets of four, each set being journaled at opposite ends in a pair of carriages 325, see Figures 3 to 8. Each carriage 325 is provided with a pair of rollers 326 which travel in elliptical shaped cam tracks 327, one positioned on each side of the drum 2.

The tracks 327 are supported from the frame at a number of places. They are supported from frame member 6 by means of a sleeve member 330 and bolt 331. They are supported from the frame member 7 by a similar connection 332 and from member 5 at two places, 333 and 334. A bracket 335 fixed to the frame member 5a serves to connect the tracks 327 with the latter member.

To cause the stripping bars to move with the needles as the drum is rotated, a pair of guide rods 340 (see Figures 3 and 4) are provided for each set of stripping bars. These rods are slidably mounted in bearings provided in sleeves 341 formed in rim 71 and the outer ends of rods 340 are journaled on studs 342 fixed to carriages 325. As the drum is rotated, the carriages 325 carrying the stripping bars 320 are forced to move with the needles by reason of their connection with the drum through the guide rods 340. The stripping bars 320 are forced to move axially of the needles by reason of rollers 326 on carriages 325 being confined in the elliptical shaped cam tracks 327. As stripping bars 320 are moved outwardly of the needles guide rods 340 slide outwardly in their bearings in sleeves 341 and the bushings 321 carried thereby push the cotton off the ends of the needles. By grouping the stripping bars in groups of four and mounting each group on a pair of carriages, only one pair of guide rods are needed for four stripping bars.

As the stripping bars are moved outwardly, a separation occurs between each set. This leaves an opening into which cotton might fall if means are not provided for preventing it from doing so. If cotton is allowed to get in contact with the needles behind the bushings 321, it tends to wedge itself between the needles and the bushing or build up in a wad around the needle at the base and causes trouble. The means for preventing cotton from getting back of the stripping bars comprises a series of overlapping plates 350, best shown in Figures 6 and 7. Each plate 350 is fixed by means of four screws 351 to the carriages of a group of stripping bars, the needles of these bars projecting through perforations 352. Each plate 350 has a slotted portion 353 which overlies a portion of the adjacent plate when the stripping bars are near the base of the needle, that is, at the time when the needles are in the plant. The needles of the adjacent group then project through the slots of portion 353. When the stripping bars are moved outwardly and the groups of stripping bars separated, the gaps between adjacent groups are substantially closed by the portion 353. It is to be noted that the present means for preventing cotton from falling into the interior portions of the picking drum does not include any moving parts or parts which will wear. Portions 353 of these plates are separated sufficiently from the lower portions 350 so that they never come in contact therewith.

The elliptical track 327 is so positioned that the stripping bars are near the outer ends of the needles when the needles are near the top of the drum. At this point a carding belt 360 is provided for collecting the cotton stripped off of the ends of the needles and conveying it rearwardly to the hopper 361. Carding belt 360 is trained over a roller 362 provided on shaft 363 and roller 364 provided on shaft 365. A revolving brush 370 is provided underneath the carding belt near the rear end thereof. This brush is revolved at a relatively high speed to pick the cotton off of the carding belt 360 and throw it into the hopper 361 from where it drops onto the flight elevator 372. The lower end of the elevator 372 is trained over a roller 373 fixed on shaft 374. Elevator 372 is supported through shaft 374 which is journaled in bearings provided in brackets 375 fixed to frame members 6. Elevator 372 carries the cotton to the rear of the machine where it is delivered into bags or other cotton receiving receptacles.

Power for operating the various parts of the picking mechanism is derived from the power take-off shaft of the tractor through connections to the transverse drive shaft 211 journaled within pipe 9. Shaft 211 is provided with a pinion 400 at each end which meshes with a gear 401 journaled in housing 8. A sprocket 402 is formed integral with gear 401. A chain 403 is trained over this sprocket and over the driving gear 404 bolted to the outer spokes 72 of the drum.

A short shaft 405 is also journaled in housing 8 and is provided with a gear 406 meshing with gear 401 and with a sprocket 407 over which the driving chain 408 is trained. Chain 408 is trained over an idler 409 and over a gear 410 mounted on shaft 363 for driving the carding belt 360. Chain 408 is also trained over a sprocket 411 fixed on shaft 371 for driving the brush. Chain 408 is also trained over a sprocket 412 mounted on shaft 374 fixed to shaft 371 for driving the elevator.

To make it possible to remove any one group of stripping bars, a section of the top flange of tracks 327 is cut away as shown at 450 (see Figures 6 and 10) to form an opening through which the carriages 325 can be lifted. This opening is normally closed by means of a cap 451 removably secured to the tracks by means of bolts 452. The opening 450 is preferably provided near the top of the tracks forwardly of idler 409.

While I have shown and described above the preferred structural embodiment of the present invention, it will be understood that my invention is not to be limited to the specific means shown and described but that, in fact, widely different means may be employed in the practice of the broader aspects of my invention.

What I claim, therefore, and desire to secure by Letters Patent is:

1. A cotton harvester comprising a wheeled supporting frame, a picker drum rotatably mounted in said frame, a plurality of radially disposed needles journaled for rotation in said drum, a plurality of stripper bars mounted on and movable axially of said needles, said stripper bars being arranged in groups of two or more, and means connecting each group of stripper bars and comprising means for guiding the latter in their movements relative to said needles as the picker drum and needles rotate during the picking operation.

2. A cotton harvester comprising a wheeled supporting frame, a transverse shaft fixed thereto, a picker drum rotatably mounted on said shaft, a plurality of radially disposed needles journaled for rotation in said drum, a plurality of stripper bars mounted for sliding movement axially of said needles, said bars being arranged in a plurality of groups of two or more bars in each group, a plurality of supporting carriages each supporting the ends of two or more stripper bars, and cam tracks disposed one on each side of said picker drum and cooperating with the carriages of the stripper bars to guide said bars in their movements relative to the needles as the picker drum and needles are rotated.

3. A cotton harvester comprising a supporting frame, a picker drum rotatably mounted in said frame, a plurality of radially disposed needles journaled for rotation in said drum, means for rotating said needles as said drum rotates, a plurality of stripping bars mounted on said needles, bushings carried by each of said bars and encircling said needles, said bars being arranged in a plurality of groups, each group comprising two or more stripping bars, cam track means disposed on each side of said picker drum, a stripping bar carriage disposed at each end of each group of stripping bars, means securing the bars of each group to the corresponding carriages, roller means associated with each carriage and cooperating with said cam tracks to guide the carriages radially inwardly and outwardly of the drum as the latter rotates to shift the stripping bars axially of the needles to remove cotton therefrom, and means to cause said carriages and stripping bars to move with the drum as the latter rotates, said means comprising a plurality of guide members slidably mounted in radial position in the drum, the outer ends of said guide means being pivotally connected with said carriages and the inner ends of said guide means extending radially inwardly with respect to the drum.

4. In a cotton harvester comprising a rotatable picker drum having rotatable radially disposed needles and stripping means axially movable along said needles and inwardly and outwardly of said drum to remove cotton therefrom, means for guiding said stripping means in said movements comprising a plurality of guide members slidably and nonrotatably supported by said drum and extending radially inwardly thereof so as to be out of contact with the cotton engaged by said needles.

5. A cotton harvester comprising a supporting frame, a picker drum rotatably mounted in said frame, a plurality of radially disposed needles journaled for rotation in said drum and arranged in a plurality of circumferential rows, stripping means movable inwardly and outwardly along said needles for stripping cotton therefrom, and means to prevent cotton from falling into the drum comprising overlapping members disposed for relative translatory movement with respect to each other and carried by said stripping means to bridge the space therebetween as said means moves radially inwardly and outwardly of the drum along said needles.

6. A cotton harvester comprising, in combination, a wheeled supporting frame, a picker drum journaled for rotation on said frame, a plurality of radiating needles supported for rotation about radial axes on said drum, a plurality of stationary shoes arranged to contact with said needles to rotate them as the picker drum is rotated, means for supporting said shoes, and means for changing the position of said shoes to adjustably determine the point at which rotation of said needles is initiated.

7. A cotton harvester comprising a supporting frame, a transverse shaft carried thereby, a picker drum mounted on said shaft for rotation relative to said frame, a plurality of radially disposed picking needles journaled for rotation in said drum, a plurality of stripping bars mounted on said needles and movable radially of the drum inwardly and outwardly along said needles to strip cotton therefrom, means for guiding said bars in their movements relative to said needles, and means rigidly carried by said bars for bridging the space therebetween to prevent cotton from falling into the drum, said rigid means being slotted to receive the needles.

8. A cotton harvester comprising a supporting frame, a transverse shaft mounted thereon, a picker drum carried by the shaft for rotation relative to said frame, a plurality of radially disposed needles journaled for rotation in said drum, means for rotating said needles as the drum rotates, stripping bars mounted on said needles for sliding movement axially thereof radially inwardly and outwardly of said drum, guide means for said stripping bars disposed out of the path of the cotton plants and operative to cause said bars to move with the drum as the same rotates and simultaneously to move inwardly and outwardly along the needles, said bars moving outwardly of the needles as they move toward their uppermost positions, and means carried by said stripping bars and operative to prevent cotton from falling into the drum as said stripping bars move upwardly toward the radially outer portions of said needles.

9. A cotton harvester comprising a supporting frame, a transverse shaft mounted thereon, a picker drum carried by the shaft for rotation relative to said frame, a plurality of radially disposed needles journaled for rotation in said drum, means for rotating said needles as the drum rotates, stripping bars mounted on said needles for sliding movement axially thereof radially inwardly and outwardly of said drum, guide means for said stripping bars operative to cause them to move with the drum as the same rotates and simultaneously to move inwardly and outwardly along the needles, said bars moving outwardly of the needles as they move toward their uppermost positions, and means carried by said stripping bars and operative to prevent cotton from falling into the drum as said stripping bars move upwardly toward the radially outer portions of said needles, said last named means comprising slotted plates carried by the bars, each of said plates including offset portions, the offset portions of adjacent plates overlapping but out of contact with one another.

10. A cotton harvester comprising a supporting frame, a transverse shaft mounted therein, a picker drum mounted on the shaft for rotation relative to the frame, a plurality of radially disposed needles journaled for rotation in said drum, means for rotating said needles as the drum rotates, stripping means carried by said needles and movable inwardly and outwardly thereof to remove cotton from the needles, said means being arranged to move outwardly of the needles as the latter move toward the upper part of the harvester during the rotation of the drum, whereby the cotton is freed from the needles at the upper part of the drum, a carding belt mounted above said drum and operative to remove the cotton from the upper part thereof as the same is stripped from the needles, and means for moving said stripping means with said drum.

11. A cotton harvester comprising a rotatable picker drum having a plurality of radially disposed needles journaled therein, means for removing cotton from said needles, and a carding belt disposed to operate in a plane tangent to the path described by the outer ends of said needles to receive the cotton as the same is stripped from said needles.

12. A cotton harvester comprising a supporting frame, a picker drum rotatably mounted thereon for rotation about a transverse horizontal axis, a plurality of radially disposed needles rotatably mounted in said drum, stripping means for removing the cotton from the needles during the upper part of their movement, a carding belt disposed above said drum and operative to receive cotton from said stripping means, and means for removing the cotton from said carding belt.

13. A cotton harvester comprising a supporting frame, a rotatable picker drum mounted in said frame, a plurality of outwardly projecting needles journaled for rotation in said drum, means for rotating the drum and needles, stripping members mounted on said needles and movable relatively thereto inwardly and outwardly of said drum to remove the cotton from the needles, a carding belt disposed to receive the cotton removed from said needles by said stripping members, a rotatable brush operative to remove the cotton from said carding belt, and elevator means arranged to convey the cotton away from the carding belt and rotatable brush.

14. A cotton harvester comprising a wheeled supporting frame, a rotatable picker drum mounted in said frame for rotation about a horizontal transverse axis, a plurality of radially disposed needles journaled for rotation in said drum, means for rotating said needles as said drum is rotated, longitudinally disposed tunnel means associated with said picker drum and operative to guide stalks toward the latter, and means movably supporting said tunnel means from the frame.

15. A cotton harvester comprising a supporting frame, a picker drum mounted for rotation in said frame, a plurality of radially disposed picker needles journaled for rotation in said drum, means for adjusting the vertical position of said drum relative to the frame, tunnel means for guiding stalks toward said drum, and means movably supporting said tunnel means from the frame irrespective of the adjustment of said drum.

16. A cotton harvester comprising a wheeled supporting frame, a picker drum mounted for rotation about a transverse horizontal axis, a supporting framework for said drum, a plurality of radially disposed needles journaled for rotation in said drum, means for adjusting the height of said framework to adjust the height of said picker drum, tunnel means movably carried by said frame and operative to guide stalks toward said drum, means for raising and lowering said picker drum toward and from transport position, and means for supporting said tunnel means and associated with said raising and lowering means so that the tunnel means is raised and lowered with said drum.

17. A cotton harvester comprising a supporting frame, a picker drum mounted for rotation about a transverse axis, a picker drum supporting framework pivotally connected at one end with said frame, adjustable means supporting the outer end of said framework whereby the height of said picker drum may be adjusted, means for raising and lowering said picker drum toward and from transport position, tunnel means pivotally supported by said supporting frame, and means connecting said tunnel means with said picker drum framework.

18. A cotton harvester comprising a wheeled supporting frame, a picker drum mounted for rotation about a horizontal axis, a plurality of radially disposed needles journaled for rotation in said drum, a supporting framework for said drum pivotally connected with said wheeled supporting frame at one end, adjusting means connecting the opposite end of said framework with said wheeled supporting frame, means for raising and lowering said framework relative to the wheeled supporting frame to raise and lower said drum toward and from transport position, tunnel means for guiding stalks toward said drum, and means supporting said tunnel means from the wheeled supporting frame and said picker drum framework whereby said tunnel means will be raised to transport position with said drum and whose vertical position will not be materially affected by the operation of said picker drum adjusting means.

19. A cotton harvester comprising, in combination, a wheeled supporting frame, rotary picker mechanism including a picker drum having spaced apart rims journaled on said wheeled supporting frame, a plurality of groups of radially disposed picker needles, a plurality of needle supporting sections removably secured to said rims and circumferentially arranged thereon to abut the radially outer peripheral edges of said rims, each section supporting one of said groups of needles for rotation, and means for rotating said drums and said needles simultaneously.

20. A cotton harvester comprising, in combination, a wheeled supporting frame, a horizontally disposed shaft fixed thereto, a picker drum journaled on said fixed shaft, said drum comprising a pair of laterally spaced wheel-like members having integrally connected hub, spoke and rim portions, a plurality of needle supporting sections mounted on said rims, a plurality of groups of needles journaled for rotation about radial axes, one group of needles being journaled in each of said sections, said sections being individually removable to remove one group of needles from the drum, stripping bars carried by said needles and movable inwardly and outwardly thereof, cam tracks for guiding said stripping bars including removable portions to permit the removal of said needle supporting sections, means for driving said picker drum, and means carried by said fixed shaft and associated with the journaled ends of said needles for rotating the latter as the drum is rotated.

21. In a cotton harvester comprising a rotatable picker drum having rotatable radially disposed needles and stripping means axially movable along said needles and inwardly and outwardly of said drum to remove cotton therefrom, means for guiding said stripping means in said movements comprising a plurality of guide members movable relative to the drum and disposed out of contact with the cotton engaged by the needles.

22. In a cotton harvester comprising a rotatable picker drum having rotatable radially disposed needles and stripping means axially movable along said needles and inwardly and outwardly of said drum to remove cotton therefrom, means for guiding said stripping means in said movements comprising a plurality of guide members journaled for rotation about the axis of the drum and movable toward and away from said axis.

23. In a cotton harvester comprising a rotatable picker drum having needles thereon, stripping means for said needles, carriage means connected with said stripping means to move the latter axially of said needles for stripping cotton therefrom, and means for guiding the movement of said carriage means comprising a plurality of guide members cooperating between the drum and said carriage means, said members being movable relative to said drum and directly with said carriage means.

24. In a cotton harvester comprising a rotatable picker mechanism having needles thereon, cotton stripping mechanism for said needles including means providing a cotton-free enclosure, and means operatively disposed within said cotton-free enclosure and adapted to guide said stripping mechanism in its movement with respect to the needles.

25. In a cotton harvester comprising a rotatable picker drum mechanism having needles thereon, cotton stripping members for said needles including guard means providing an enclosure to prevent cotton from falling into the picker drum mechanism, said guard means comprising relatively movable overlapping elements individually carried by each of said stripping members.

26. In a cotton harvester comprising a rotatable picker drum mechanism having needles thereon, cotton stripping members for said needles including guard means providing an enclosure to prevent cotton from falling into the picker drum mechanism, said guard means comprising relatively movable elements each fixedly secured to one of said stripping members.

27. In a cotton harvester comprising a rotatable picker drum mechanism having needles thereon, cotton stripping members for said needles including guard means providing an enclosure to prevent cotton from falling into the picker drum mechanism, said guard means comprising elements each fixedly secured to one of said stripping members, each of said elements being offset to overlap the next adjacent element.

28. A cotton harvester comprising a horizontally disposed rotatable picker drum having a plurality of radially projecting needles, means for stripping cotton from said needles, and a carding belt mounted above the outer tips of said needles to receive cotton that is stripped from said needles.

29. A cotton harvester comprising a rotatable picker drum having a plurality of radially disposed needles, means for stripping cotton from said needles, and a carding belt having one run thereof operating in a plane disposed substantially at right angles to the axes of said needles to receive cotton that is stripped from the latter.

30. A cotton harvester comprising a horizontally disposed rotatable picker drum having a plurality of radially projecting needles, means for stripping cotton from said needles, a carding belt operatively disposed above the needles of said picker drum and having one run thereof operating in a plane disposed substantially at right angles to the axes of said needles to receive cotton that is stripped from the latter, and means for removing cotton from the carding belt.

31. A cotton harvester comprising a rotatable picker drum having a plurality of radially disposed needles, means for stripping cotton from said needles comprising a plurality of stripper bars movable axially of said needles, and means pivotally connected with said stripper bars and adapted to guide the same axially with respect to the needles and to move said bars about the axis of said drum.

32. A cotton harvester comprising a rotatable picker drum having a plurality of radially disposed needles, cotton stripping members associated with said needles for stripping cotton axially therefrom, and means movable axially of said drum and rotating therewith for moving said stripping members about the axis of said drum and to maintain said members in operative relation to said needles.

FREDERICK A. THOMANN.